US006311668B1

(12) United States Patent
Milam

(10) Patent No.: US 6,311,668 B1
(45) Date of Patent: Nov. 6, 2001

(54) MONOVALVE WITH INTEGRATED FUEL INJECTOR AND PORT CONTROL VALVE, AND ENGINE USING SAME

(75) Inventor: David M. Milam, Metamora, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/503,659

(22) Filed: Feb. 14, 2000

(51) Int. Cl.$^7$ .................................................. F02M 57/04
(52) U.S. Cl. ............................................................ 123/296
(58) Field of Search ........................... 123/296, 90.12, 123/90.13, 320, 79 R, 480, 446

(56) References Cited

U.S. PATENT DOCUMENTS

| | | | |
|---|---|---|---|
| 2,044,522 | 6/1936 | Wurtele | 123/296 |
| 2,071,719 | 2/1937 | Wurtele | 123/296 |
| 2,072,437 | 3/1937 | Wurtele | 123/90.12 |
| 2,082,853 | 6/1937 | Stoikowitz | 123/79 C |
| 2,280,386 | 4/1942 | Dickson | 123/296 |
| 3,590,791 | 7/1971 | Roosa | 123/79 R |
| 3,812,829 | 5/1974 | McCormick | 123/296 |
| 4,020,803 | 5/1977 | Thuren et al. | 123/275 |
| 4,058,091 | 11/1977 | Tanahaski | 123/261 |
| 4,674,450 | 6/1987 | Krajancich | 123/79 A |
| 4,809,655 | 3/1989 | Mahler | 123/296 |
| 5,249,553 | 10/1993 | Guiod | 123/41.4 |
| 5,398,647 | 3/1995 | Rivera | 123/79 R |
| 5,417,188 | 5/1995 | Schiattino | 123/190.2 |
| 5,522,358 | * 6/1996 | Clarke | 123/296 |
| 5,572,967 | 11/1996 | Donaldson, Jr. | 123/190.12 |
| 5,597,118 | 1/1997 | Carter, Jr. et al. | 239/92 |
| 5,624,072 | 4/1997 | Okajima et al. | 239/92 |
| 5,638,781 | 6/1997 | Sturman | 123/90.12 |
| 5,682,846 | 11/1997 | Scharnweber | 123/90.12 |
| 5,709,178 | 1/1998 | Feucht | 123/90.12 |
| 5,713,315 | 2/1998 | Jyoutaki et al. | 123/90.12 |
| 5,713,316 | 2/1998 | Sturman | 123/90.12 |
| 5,934,245 | 8/1999 | Miller et al. | 123/296 |
| 5,957,106 | 9/1999 | Maloney et al. | 123/296 |
| 6,129,072 | * 10/2000 | Graves | 123/446 |

OTHER PUBLICATIONS

Turbine World Wide, Mar., 1996. ADD, Inc., Advanced Design Medium Speed Engine Announced by ADD, pp. 16,18–19 of Diesel and Gas.

* cited by examiner

Primary Examiner—Henry C. Yuen
Assistant Examiner—Hieu T. Vo

(57) ABSTRACT

An engine includes an engine casing that defines a hollow piston cavity separated from an exhaust passage and an intake passage by a valve seat. A gas exchange valve member is positioned adjacent the valve seat and is moveable between an open position and a closed position. The gas exchange valve member also defines an opening that opens into the hollow piston cavity. A needle valve member is positioned in the gas exchange valve member adjacent a nozzle outlet and is moveable between an inject position and a blocked position. A port control valve member, which has a hydraulic surface, is mounted around the gas exchange valve member and moveable between an intake position and an exhaust position. A pilot valve is moveable between a first position at which the port control hydraulic surface is exposed to a source of high pressure fluid, and a second position at which the port control hydraulic surface is exposed to a source of low pressure fluid.

12 Claims, 9 Drawing Sheets

Fig_3_

Fig_6_

Fig_7_

MONOVALVE WITH INTEGRATED FUEL INJECTOR AND PORT CONTROL VALVE, AND ENGINE USING SAME

The Government has the rights in this invention pursuant to Contract No. DE-FC05-97OR22605-RS96-006 awarded by the U.S. Department of Energy.

TECHNICAL FIELD

The present invention relates generally to valving systems for internal combustion engines, and more particularly to the integration of mono valves with fuel injectors and port control valves.

BACKGROUND ART

Engineers are constantly looking for ways to improve the efficiency and performance of internal combustion engines. Several conflicting demands on some engines have placed undesirable spatial limitations relating to the intake and exhaust valves as well as the incorporation of a suitable fuel injection system. In many diesel type engines, four gas exchange valves (two intake and two exhaust) surround a centrally mounted fuel injector whose tip protrudes directly into the hollow piston's cylinder. Because manufacturing constraints generally restrict each of the valves and fuel injectors to a circular cross section, the size of these components is limited by each other and the size of the piston for a given engine. These spatial constraints often result in compromises between the valves and fuel injector that result in an engine with less efficiency and lower performance levels than should otherwise be possible.

In many engines, both the gas exchange valves and the fuel injection system are coupled in their operation to the crank shaft angle of the engine. In other words, in many engines these components are driven to operate by a rotating cam that is driven to rotate directly by the engine. Engineers have recognized that combustion efficiency and overall engine performance can be improved by decoupling the operation of the fuel injection system from the rotation angle of the engine. In this regard, Caterpillar, Inc. of Peoria has seen considerable success by incorporating hydraulically-actuated electronically-controlled fuel injectors into engines. These fuel injection systems allow an engine computer to inject a calculated amount of fuel, often in a pre-determined way, into the combustion space in a timing that is based upon sensed operating conditions and other parameters.

In part because of the gains observed by the incorporation of hydraulically-actuated electronically-controlled fuel injectors, engine research has shown that further improvements in performance and efficiency can be gained by also decoupling the gas exchange valves from the engine rotation angle. In other words, it is also desirable that the gas exchange valves be electronically controlled in order to control exhaust and intake portions of the engine cycle independent of the engine crank shaft angle. This could allow the intake and exhaust portions of the engine cycle to be optimized for a particular operating condition and other parameters, such as temperatures, and load/speed conditions, etc. The present invention is directed to overcoming these and other problems, as well as improving the efficiency and performance of engines in general.

DISCLOSURE OF THE INVENTION

In one aspect, an engine has a casing that defines a hollow piston cavity separated from an exhaust passage and an intake passage by a valve seat. A gas exchange valve member is positioned adjacent the valve seat and is moveable between an open position and a closed position. The gas exchange valve member defines an opening that opens into the hollow piston cavity. A needle valve member is positioned in the gas exchange valve member adjacent a nozzle outlet, and is moveable between an inject position and a blocked position. A port control valve member has a port control hydraulic surface and is mounted around the gas exchange valve member. The port control valve is moveable between an intake position at which the exhaust passage is blocked, and an exhaust position at which the intake passage is blocked. A pilot valve is moveable between a first position at which the port control hydraulic surface is exposed to a source of high pressure fluid, and a second position at which the port control hydraulic surface is exposed to a source of low pressure fluid.

In an another aspect, a valve includes a valve body that defines a first passage and a control passage. A valve member is positioned in the valve body and includes a first hydraulic surface, a control hydraulic surface and a second surface. The valve member is moveable between an up position and a down position. The first hydraulic surface is exposed to fluid pressure in the first passage when the valve member is in its down position, but only a portion of the first hydraulic surface is exposed to fluid pressure in the first passage when the valve member is in its up position. The control hydraulic surface is exposed to fluid pressure in the control passage. The valve also includes a source of low pressure fluid, a source of high pressure fluid and a biaser in contact with the second surface. The valve member is biased toward its down position when the valve member is in its down position and the first passage is fluidly connected to the source of high pressure fluid. The valve member is biased toward its down position when the valve member is in its up position, the first passage is fluidly connected to the source of high pressure fluid and the control passage is fluidly connected to the source of high pressure fluid. The valve member is biased toward its up position when the valve member is in its up position, the first passage is fluidly connected to the source of high pressure fluid and the control passage is fluidly connected to the source of low pressure fluid.

In still another aspect, an electronically controlled device includes a body and a port control valve member movably positioned in the body. A gas exchange valve member is at least partially positioned in the port control valve member. A fuel injector has a direct control needle valve and is at least partially positioned in the gas exchange valve member. A first electrical actuator is operably coupled to the direct control needle valve. A second electrical actuator is operably coupled to the gas exchange valve member and the port control valve.

BEST MODE FOR CARRYING OUT THE INVENTION

Figure 1:
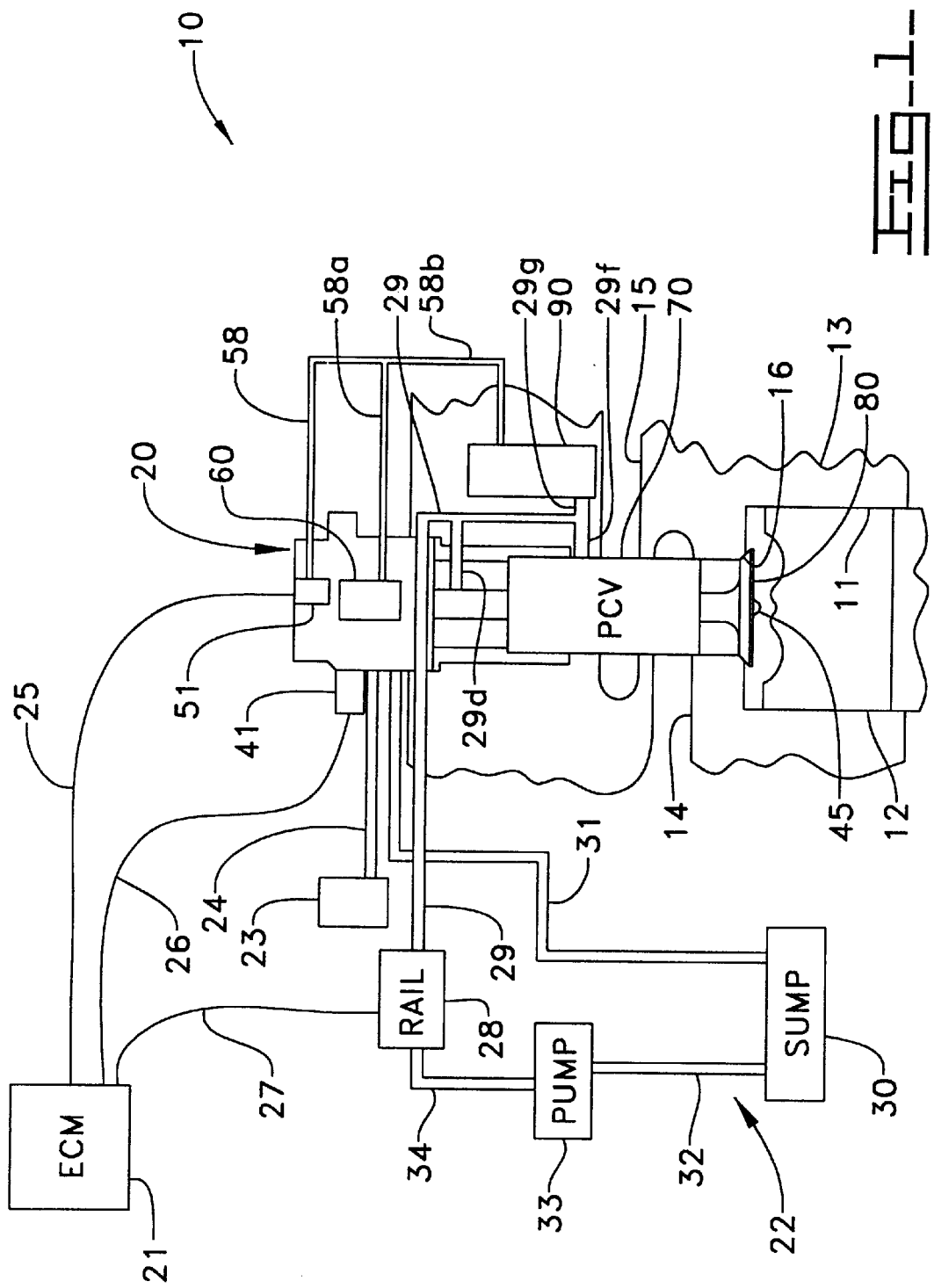
FIG. 1 is a schematic view of an engine and valving system according to one aspect of the present invention.
Figure 2:
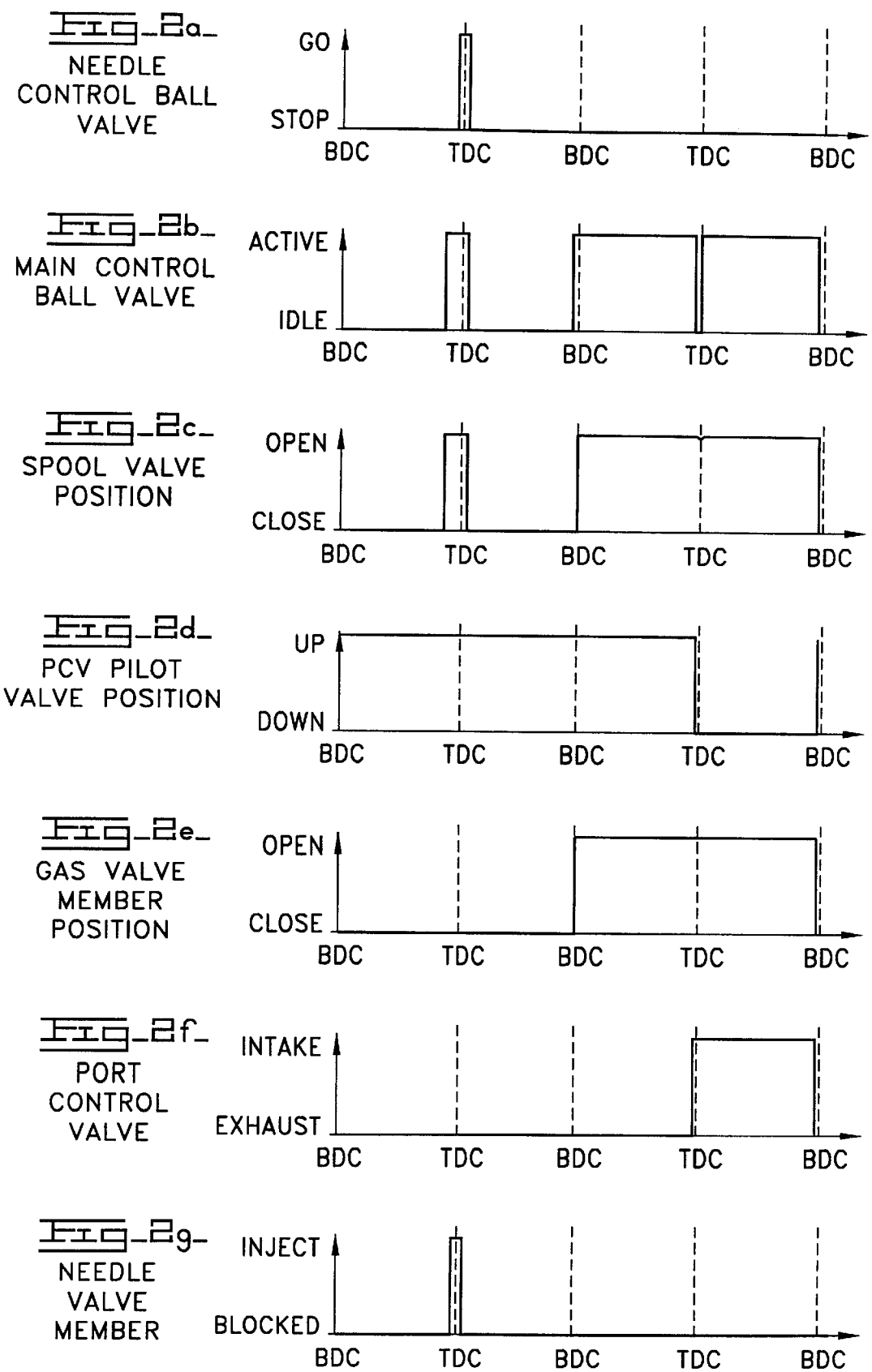
FIGS. 2a–g show various parameters including needle control ball valve position, main control ball valve position, spool valve position, PCV pilot valve position, gas exchange valve member position, port control valve position, and needle valve member position, respectively, versus piston position for a single engine cycle according to one example aspect of the present invention.

Referring now to FIG. 1, engine 10 has a casing 13 that defines a hollow piston cavity 11 within which a piston 12 reciprocates in a conventional manner between a top dead center (TDC) position and a bottom dead center (BDC) position. Hollow piston cavity 11 is separated from an intake passage 14 and an exhaust passage 15 by a valve seat 16 and a gas exchange valve member 80. A mono valve fuel injector 20 is mounted in engine casing 13 and centered above hollow piston cavity 11. Mono valve fuel injector 20 includes a gas exchange valve member 80 that is positioned adjacent valve seat 16 and is moveable between an open position and a closed position, as shown. Gas exchange valve member 80 defines a central opening that receives a fuel injector tip defining a nozzle outlet 45 that opens directly into hollow piston cavity 11. The fuel injector tip could be considered part of gas exchange valve 80 since it partially blocks the gas exchange port. Those skilled in the art will also realize that equivalent nozzle/gas exchange valve structures shown in U.S. Pat. Nos. 5,934,245 and 5,957,106 are also contemplated for the present invention. Mono valve fuel injector 20 also includes a port control valve 70 that is mounted around a portion of gas exchange valve member 80 and is moveable between an intake position and an exhaust position, as shown. Thus, mono valve fuel injector 20 performs three (3) different functions: direct control fuel injection; opening and closing of the gas exchange valve member for the exchange of intake and exhaust gases; and, control over which of the exhaust or intake passages is open at any given time.

The various sub-systems of mono valve fuel injector 20 are hydraulically actuated using an available fluid raised to a relatively high working pressure, such as pressurized engine lubricating oil. The actuation fluid system 22 includes a low pressure reservoir 30, such as an oil pan, and a high pressure actuation fluid reservoir 28. A high pressure pump 33 draws low pressure oil from reservoir 30 via a pump supply line 32 and delivers relatively high pressure oil to high pressure reservoir 28 via a pump outlet line 34. A high pressure supply line 29 leads from high pressure reservoir 28 into mono valve fuel injector 20 and branches off into various passages 29a–i to hydraulically bias certain components to certain positions and to provide a source of high pressure fluid to perform the various functions of the overall system. In FIG. 1, high pressure supply line 29 is shown branching off into a biasing line 29d that hydraulically biases gas exchange valve member 80 to its upward closed position as shown. Another high pressure biasing line 29f acts to hydraulically bias port control valve member 70 toward a downward exhaust position. Still another high pressure biasing line 29h serves to bias a port control pilot valve 90, which is discussed in detail infra, toward an upward position. After performing work within mono valve fuel injector 20, low pressure oil is drained back to low pressure reservoir 30 via a drain passage 31 which includes multiple branches 31a–c. Fuel is supplied to mono valve fuel injector 20 from a fuel tank 23 via a fuel supply passage 24 in a conventional manner.

The operation of mono valve fuel injector 20 is controlled by a single electronic control module 21. The overall operation of mono valve fuel injector 20 is controlled by a first electrical actuator 41, a second electrical actuator 51, and a pressure control device attached to high pressure reservoir 28. These various controllers are controlled by electronic control module 21 via communication control lines 26, 25, and 27, respectively. Those skilled in the art will appreciate that the speed and other aspects of the mono valve fuel injector 20's performance can be controlled by the magnitude of the high pressure in high pressure reservoir. 28. The first electrical actuator 41 controls a direct control needle valve system, which is described infra, and relates to the opening and closing of nozzle outlet 45. Finally, the movement of gas exchange valve member 80, port control valve member 70, port control pilot valve 90, and spool flow control valve 60 are all operably coupled to the second electrical actuator 51. Depending upon the activation position of second electrical actuator 51, a control passage 58 (and branches 58a–b) is either connected to high pressure supply line 29 or low pressure drain passage 31. Control passage 58 is connected to a spool control branch passage 58a that controls the positioning of spool flow control valve 60, and branches in another direction to pilot control branch passage 58b, which controls the positioning of port control pilot valve member 90.

Figure 3:
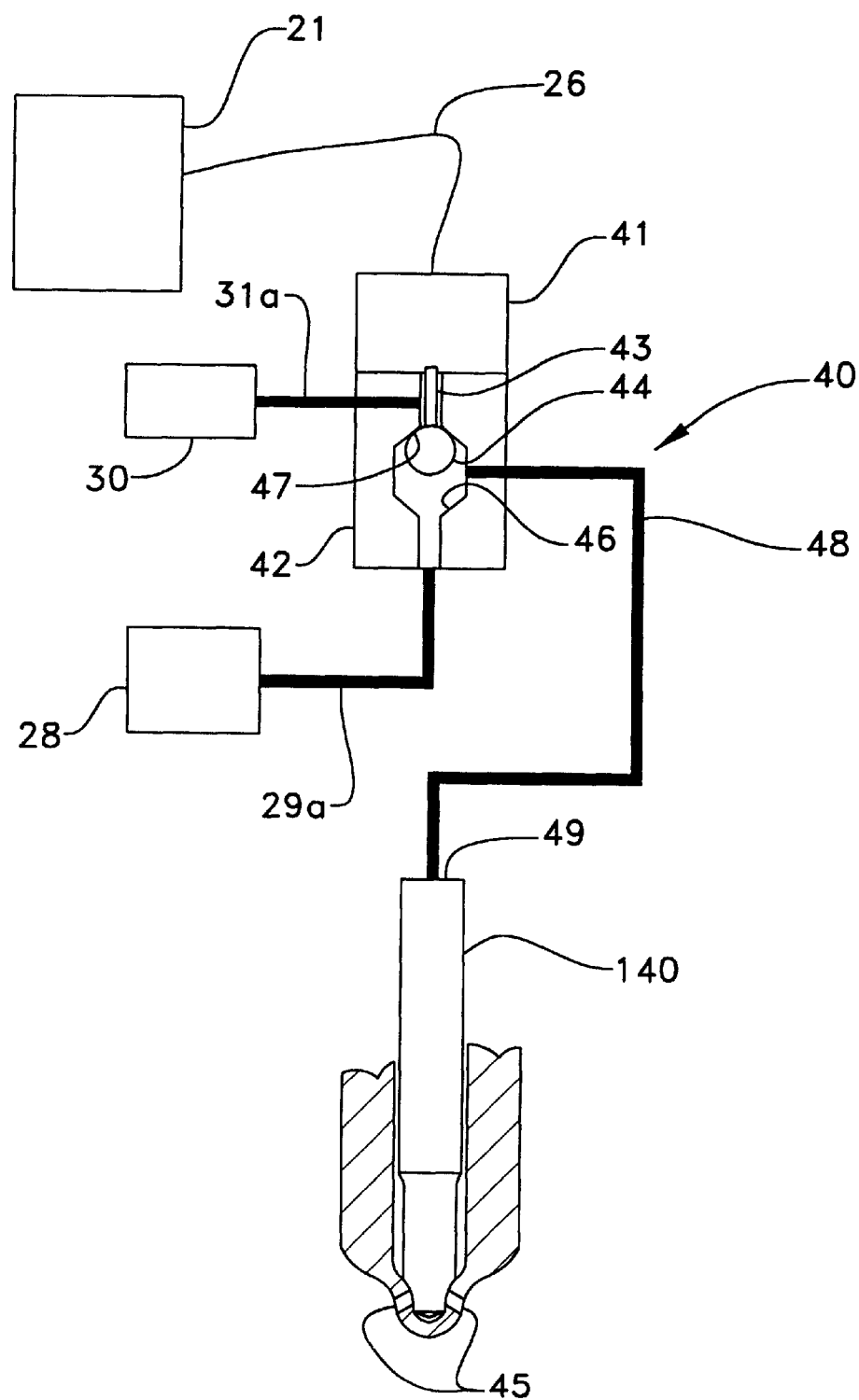
FIG. 3 is a schematic view of a direct control needle valve according to one aspect of the present invention.
Figure 6:
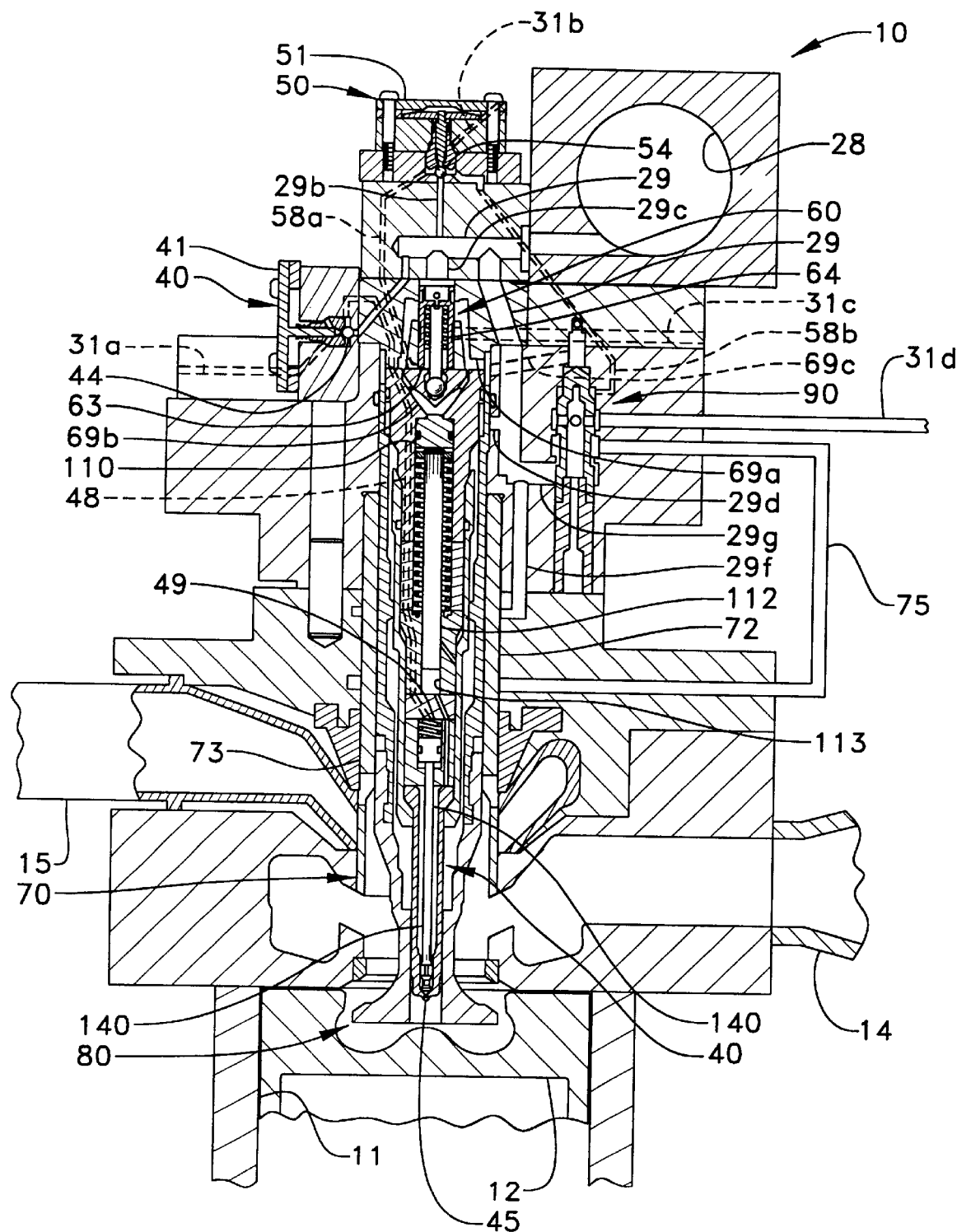
FIG. 6 is a diagrammatic sectioned side view of a mono valve with integrated fuel injector and port control valve mounted in an engine according to another aspect of the present invention.
Figure 7:
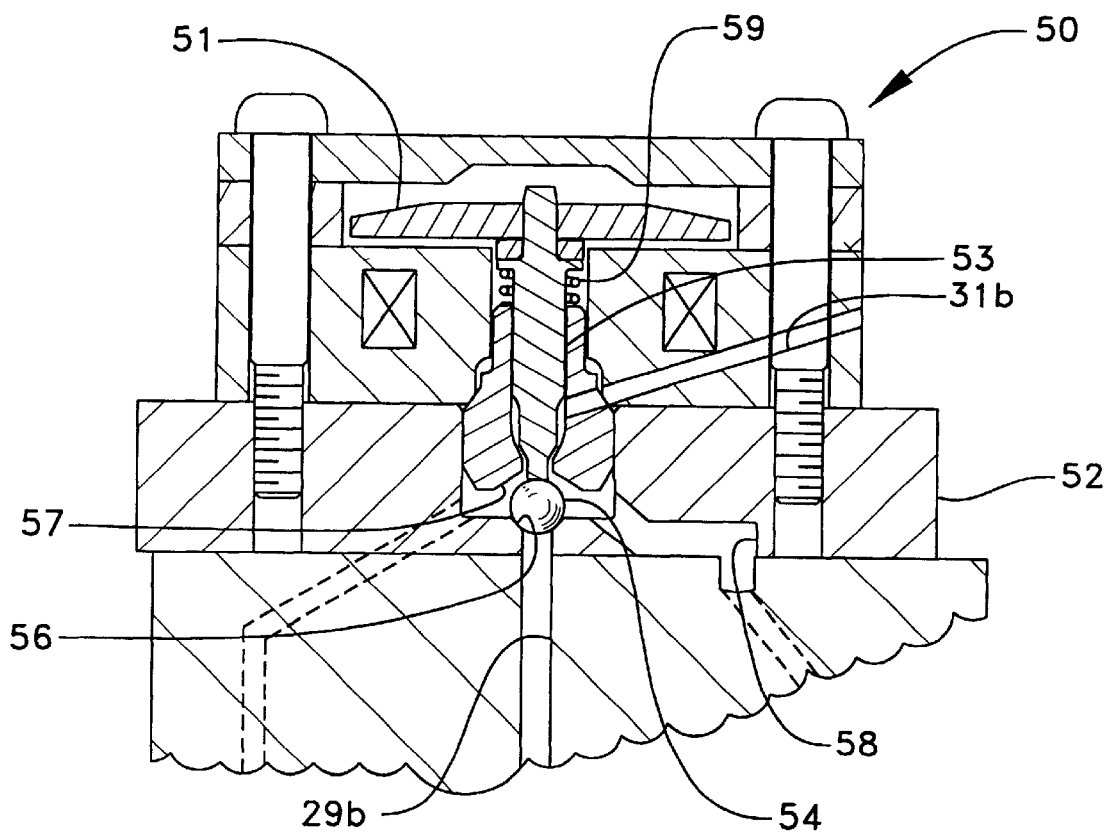
FIG. 7 is an enlarged sectioned diagrammatic view of a ball valve according to one aspect of the present invention.

Referring now, in addition to FIGS. 3 and 6, the direct control needle system 40 aspect of the invention is illustrated. Direct control needle system 40 includes a first electrical actuator 41 that is attached to a valve body 42, which includes a ball valve member 44 trapped between a high pressure seat 46 and a low pressure seat 47. The passageway below pressure seat 46 is connected to the high pressure fluid reservoir 28 identified earlier via a high pressure supply line branch passage 29a. The area above low pressure seat 47 is connected to the previously identified low pressure reservoir 30 via a branch drain passage 31a. When electrical actuator 41 is deactivated, a biaser, such as a spring, biases a pin 43 to an upward position out of contact with ball valve member 44. When electronic control module 21 commands electrical actuator 41 to activate, pin 43 is moved downward into contact with ball valve member 44 and pushes the same into contact to close high pressure seat 46. A needle control passage 48 opens on one end into the area between high pressure seat 46 and low pressure seat 47, and on its other end to a needle control chamber in which a closing hydraulic surface 49 of needle valve member 140 is exposed to fluid pressure. In order to perform like a conventional direct control needle, the size of closing hydraulic surface 49 and the magnitude of the high pressure fluid are chosen such that needle valve member 140 will remain in a downward closed position blocking nozzle outlet 45 when electrical actuator 41 is de-energized such that ball valve member closes low pressure seat 47, as shown. When electrical actuator 41, which is preferably a solenoid but could be another suitable actuator such as a piezo electric actuator, is activated, high pressure seat 46 is closed and closing hydraulic surface 49 of needle valve member 140 is exposed to low pressure. When in this position, needle valve member 140 preferably behaves like a conventional spring biased needle check. Thus, the various pressures and surface areas are chosen such that needle valve member 140 can be pushed downward to, or held in a closed position at anytime during an injection event, even when fuel pressures are relatively high within the system.

Figure 4:
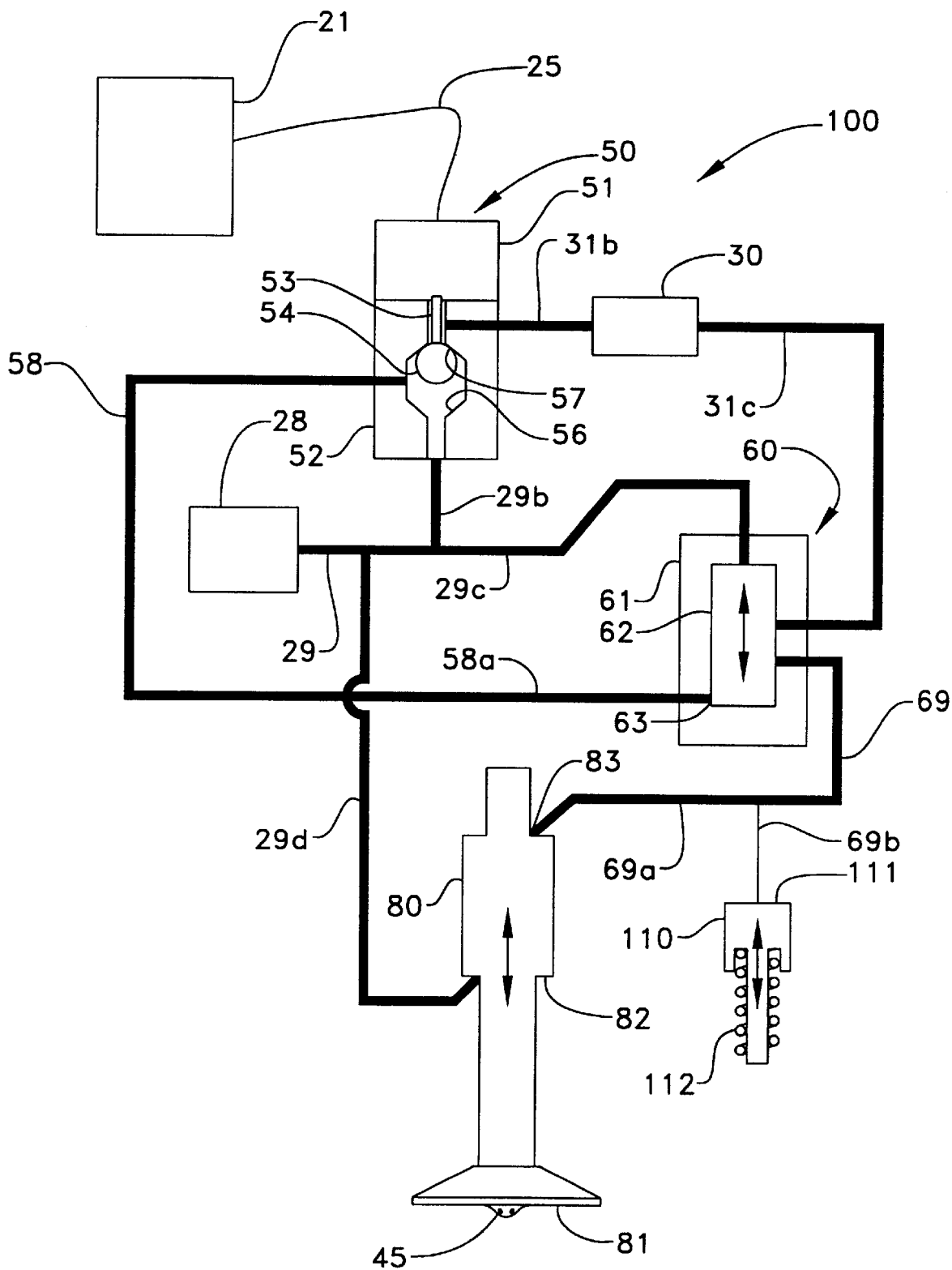
FIG. 4 is a schematic view of a fuel pressurization and gas exchange valving system according to one aspect of the present invention.

Referring now to specifically FIG. 4 and in addition, FIGS. 1, 6, 7 and 8, the fuel pressurization and gas exchange system 100 aspect of the present invention is illustrated. This portion of the mono valve fuel injector 20 is controlled in its operation by a main control valve 50, which preferably has a structure substantially identical to the direct needle control valve previously described. In particular, main control valve 50 includes an electrical actuator 51, which is preferably a solenoid, that is connected to electronic control module 21 via a communication control line 25. Electrical actuator 51 is attached to a valve body 52 within which a ball valve member 54 is trapped between a high pressure seat 56 and a low pressure seat 57. When actuator 51 is de-energized, a pin 53 is biased via a spring 59 to an upward position out of contact with ball valve member 54, which is acted upon by high pressure to hydraulically push the same into the position shown in FIG. 4 to close low pressure seat 57. When electrical actuator 51 is energized, pin 53 drives ball valve member 54 downward to open low pressure seat 57 and close high pressure seat 56. A control pressure communication passage 58 opens on one end into the area between high pressure seat 56 and low pressure seat 57. Thus, when electrical actuator 51 is de-energized, as shown in FIG. 4, control passage 58 is connected to high pressure reservoir 28 via high pressure supply branch passage 29*b*. When solenoid 51 is energized, control passage 58 is connected to low pressure reservoir 30 via low pressure drain passage 31*b*.

Figure 8:
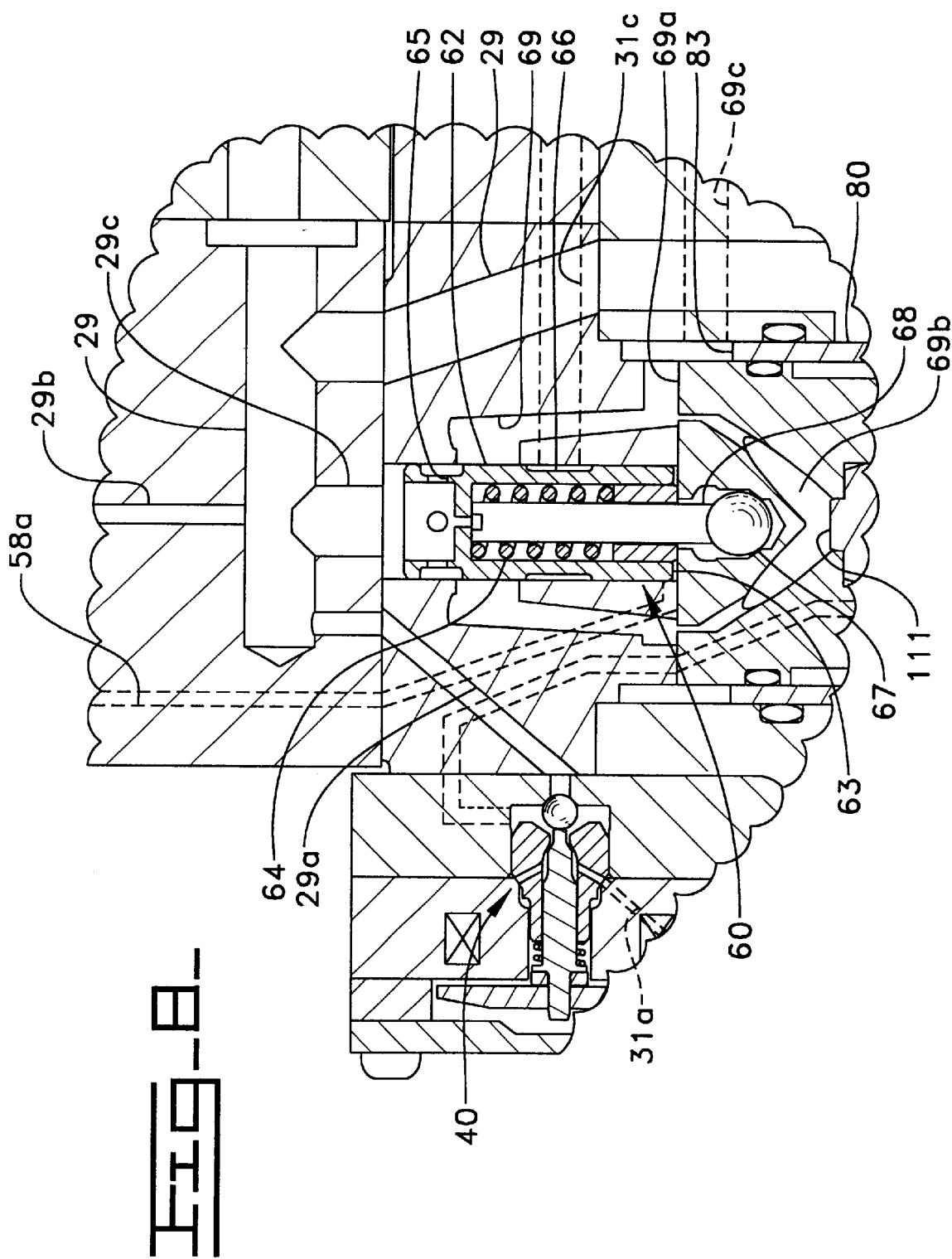
FIG. 8 is an enlarged diagrammatic sectioned view of a spool flow control valve according to another aspect of the present invention.

One branch 58*a* of control passage 58 exposes end hydraulic surface 63 of spool valve member 62 to the pressure within control passage 58. (See FIG. 8) This is the means by which main control valve 50 is operably coupled to the operation of spool flow control valve 60. Spool valve member 62 includes an opposite end that is always exposed to the high pressure existing in a branch 29*c* of high pressure supply line 29. Thus, when pressure in control passage 58*a* is low, the constant high pressure acting on the opposite end of spool valve member 62 urges the same downward against the action of biasing spring 64 to a position as shown in FIG. 8, where the branch 29*c* of high pressure supply line 29 is fluidly connected to actuation fluid flow passage 69 via radial passage 65. When the pressure in control passage 58*a* is high, spool valve member 62 preferably becomes hydraulically balanced such that biasing spring 64 urges the same upward to a position at which supply line 29*c* is blocked but actuation fluid flow passage 69 is connected to a branch drain passage 31*c* via an annulus 66. Flow control valve 60 also includes a pressure relief ball 67 and pressure relief pin 68 that are positioned within the valve body 61. A bottom surface of ball 67 is exposed to pressure in a branch 69*b* of actuation fluid flow passage 69 via a hidden passage that is not shown. This serves as the means by which secondary injection events are inhibited because these two components exploit the residual pressure in branch flow passage 69*b* at the end of an injection event to hasten the upward movement of spool valve member 62. As best seen in FIGS. 4 and 8, actuation fluid flow passage 69 has a first branch 69*b* that acts upon a hydraulic surface 111 of an intensifier piston/plunger 110, and a second branch 69*a* that acts upon an opening hydraulic surface 83 of gas exchange valve member 80.

Figure 9:
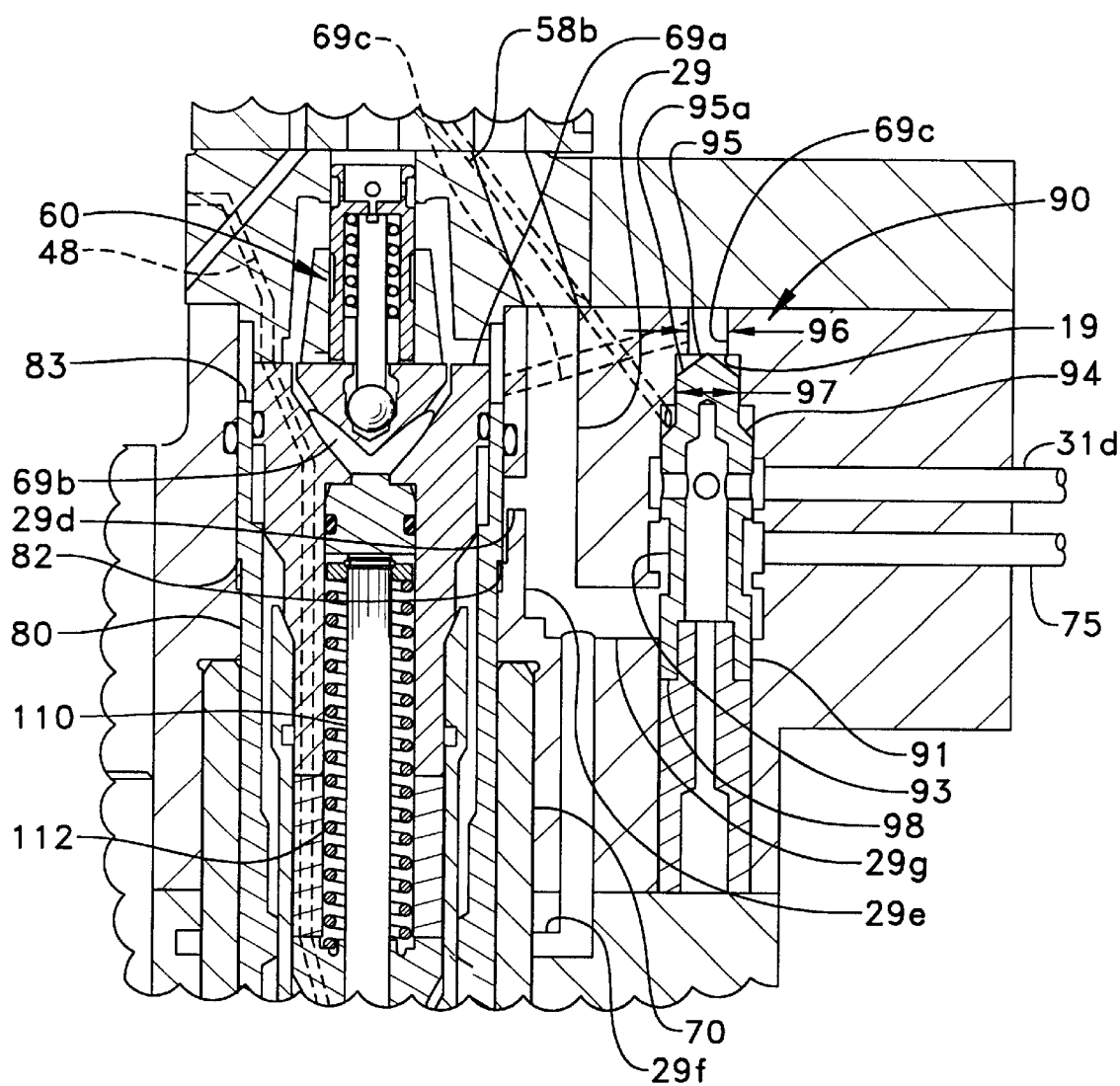
FIG. 9 is an enlarged sectioned diagrammatic view of a port control pilot valve according to still another aspect of the present invention.

As best seen in FIGS. 6 and 9, intensifier piston/plunger 110 is the means by which fuel within a fuel pressurization chamber 113 is pressurized to injection pressure. This pressurization occurs during an injection event as intensifier piston/plunger 110 is hydraulically driven downward. Between injection events, a return spring 112 biases intensifier piston/plunger 110 to an upward retracted position in a conventional manner as shown. This fuel pressurization aspect of the present invention is very similar to features described in several previous patents owned by Caterpillar, Inc. of Peoria, Ill.

With regard to gas exchange valve member 80, it is normally hydraulically biased upward toward a closed position by a continuous high fluid pressure force in branch supply line 29*d* acting upon a biasing hydraulic surface 82. Of course, those skilled in the art will appreciate that some other biaser, such as a spring could be substituted for the hydraulic force acting on bias hydraulic surface 82 and achieve the same results. The positioning of gas exchange valve member 80 is influenced by the size and pressures acting upon a closing hydraulic surface 81, which is exposed to gas pressure in the hollow piston cavity 11, the bias hydraulic surface 82 which is always exposed to the high fluid pressure in high pressure reservoir 28, and the opening hydraulic surface 83 that may be exposed to high or low pressure depending upon the positioning of flow control valve 60. These surfaces and pressures are preferably sized such that gas exchange valve member 80 will remain in a closed position when pressures in the hollow piston cavity 11 are high, such as during compression or combustion, even though fluid pressures in branch fluid flow passage 69a acting on opening hydraulic surface 83 may also be high. In other words, these surfaces and pressures are preferably sized such that gas exchange valve member 80 can only be moved to an open position when pressures in hollow piston cavity are relatively low. Thus, intensifier piston/plunger 110 will be the only part driven downward during an injection event because pressures acting on surface 81 in the hollow piston cavity 11 are relatively high such that gas exchange valve member 80 is held closed, and any high pressure fluid from flow control 60 is channeled into branch flow passage 69*b*.

Turning now to FIGS. 1, 6, 9, and especially 5, the various components that make up the port control system 120 according to the preferred embodiment of the present invention are illustrated. The port control system shares several components in common with the previously described fuel pressurization and gas exchange system 100 illustrated in FIG. 4. These items include the sharing of the same main control valve 50 and spool control valve 60 as well as the respective sources of high and low fluid pressure 28 and 30. Thus, these portions of port control system 120 will not be re-described. In this subsystem, the port control valve 70 is operably coupled to the main control valve 50 via the PCV pilot valve 90 and the spool flow control valve 60, both of which are controlled in their positioning by the pressure existing in control passage 58, and its respective branch passages 58*a* and 58*b*. Port control valve 70 is normally hydraulically biased downward toward an exhaust position in which the intake passage is closed, by constant high pressure acting on a bias hydraulic surface 72. This constant high pressure is supplied from high pressure reservoir 28 via supply branch passages 29, 29*e* and 29*f*. Port control valve 70 can be moved upward toward its intake position, where the exhaust passage is blocked, when hydraulic pressure acting on control hydraulic surface 71 is high. Those skilled in the art will appreciate that the biasing direction of port control valve 70 could be reversed and some other biaser, such as a spring, could be substituted for the hydraulic biasing described in the preferred embodiment.

Figure 5:
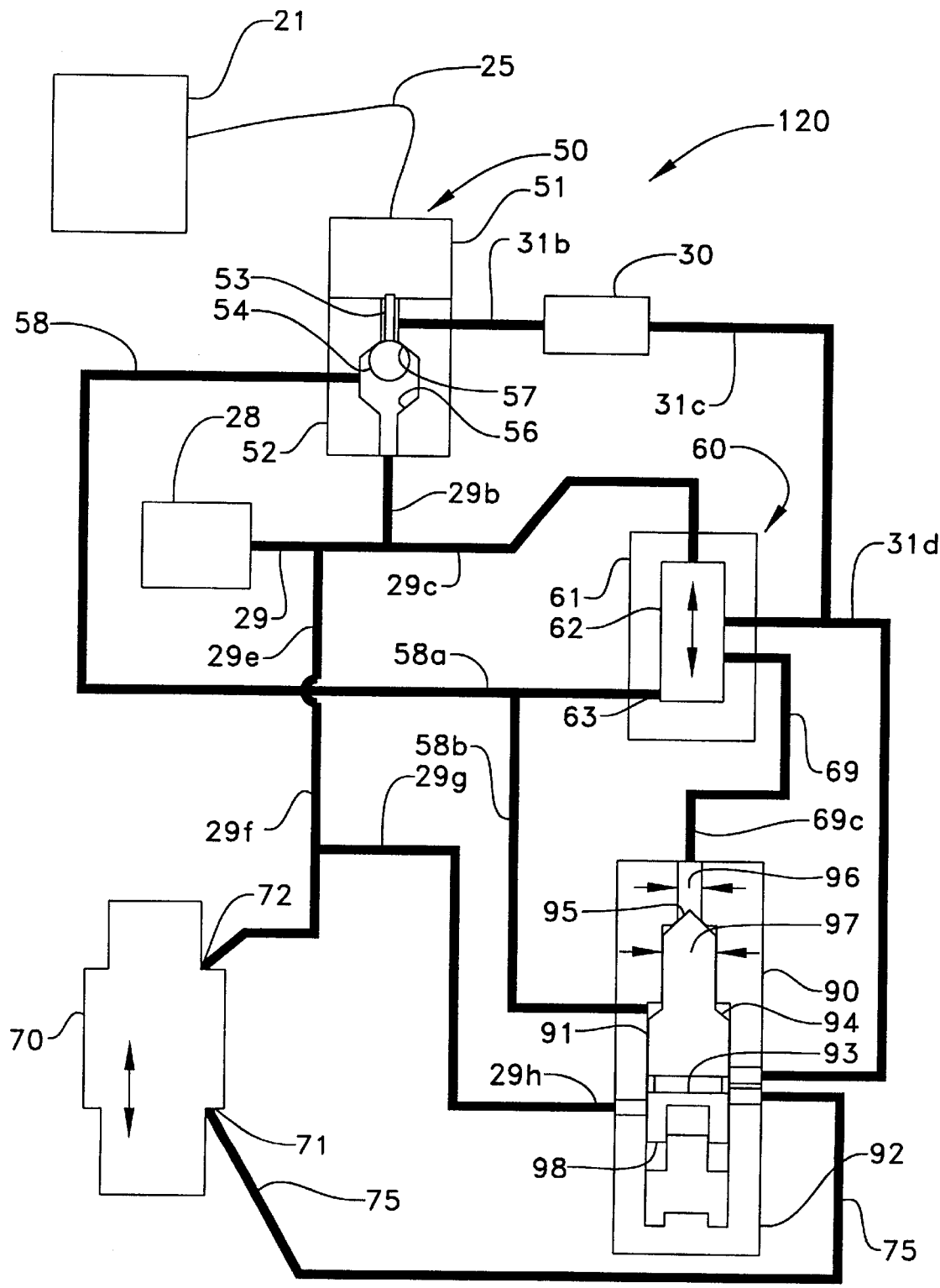
FIG. 5 is a schematic view of a port control valve system according to one aspect of the present invention.

In this embodiment, pressure in a control flow passage 75, which acts upon control hydraulic surface 71, can only be high when a pilot valve member 91 of PCV pilot valve 90 is moved to a downward position as shown in FIGS. 6 and 9. When in such a position, an annulus 93 directly connects control flow passage 75 to the high pressure reservoir 28 via high pressure supply branch passages 29, 29e, and 29g. Pilot valve member 91 is normally biased upward to a position shown in FIG. 5 that closes annulus 93 to branch 29g by a constant high pressure acting on annular biasing hydraulic surface 98. This high pressure is again provided by high pressure reservoir 28 via supply branch passages 29, 29e, and 29g, and communication grooves on the outer surface of pilot valve member 91. Nevertheless, those skilled in the art will appreciate that some other biaser, such as a spring, could be substituted for the hydraulic biasing means described. In addition to biasing hydraulic surface 98, pilot valve member 91 includes a control hydraulic surface 94 that is exposed to fluid pressure in branch control passage 58b, and a top hydraulic surface 95 which is fluidly connected to branch passage 69c of actuation fluid flow passage 69. It is important to note that, in this preferred embodiment, only an inner portion of top hydraulic surface 95, corresponding to a reduced area 96, is exposed to the fluid pressure in branch fluid flow branch passage 69c when pilot valve member 91 is in its upward position as shown in FIG. 5; however, the complete top hydraulic surface 95, which corresponds to enlarged area 97, is exposed to fluid pressure in fluid flow branch passage 69c when pilot valve member 91 moves downward away from its upward position, as shown in FIGS. 6 and 9. In order to isolate port control system 120 during an injection event, fluid flow branch passage 69c is blocked by gas exchange valve member 80 when the same is in its upward closed position.

The various surfaces, biasing forces and fluid pressures relating to PCV pilot valve 90 are chosen such that pilot valve member 91 will be biased upward to the position shown in FIG. 5 whenever the pressure in branch fluid flow passage 69c is low due to the positioning of spool flow control valve 60, or blockage due to gas exchange valve member 80. These various features are also preferably chosen such that pilot valve member 91 is biased to remain in its upward position when pressure in branch fluid passage 69c is high but the pressure in branch control passage 58b is low, which is determined by the positioning of main control valve 50. These various surfaces and pressures are preferably also chosen such that pilot valve member 91 will only be biased downward away from its upward position when pressure in fluid flow branch passage 69c and branch control passage 58b are both 20 high, by an appropriate positioning of both main control valve 50 and spool flow control valve 60. Once pilot valve member 91 moves away from seat 19 (FIG. 9) to expose the complete top hydraulic surface 95 to pressure in fluid flow branch passage 69c, it becomes biased toward a downward position where annulus 93 can fluidly connect branch passage 29g to control flow passage 75. Thus, provided that high pressure exists in branch flow passage 69c, pilot valve member 90 can be moved toward its downward position by only briefly opening branch control passage 58b to high pressure via main control valve 50.

Referring briefly, and specifically to FIG. 9, the preferred structure of pilot valve member 91 is such that its annular biasing hydraulic surface 98 is always exposed to high pressure in branch supply passage 29g via a plurality of slots in member 91. Also, as with the other valves that make up the overall invention, each valve can be considered to have its own valve body. And each valve member can be thought of and the associated flow passages can be thought of as being positioned in its own valve body, such as PCV pilot valve 90 including valve body 92. When pilot valve member 91 is in its upward position shown in FIG. 5, control flow passage 75 can drain to drain passage 31d via annulus 93.

INDUSTRIAL APPLICABILITY

Referring now to all the drawings, but primarily FIG. 6 and the graphs of FIGS. 2a–2g, the functioning of the present invention for a single example engine cycle will be described. FIGS. 2a–2g show various key components of the preferred embodiment graphed versus piston position for one complete engine cycle (4 cycle), where the piston reciprocates twice between bottom dead center and top dead center. Nevertheless, those skilled in the art will appreciate that none of the features graphed against the piston position is actually a function of the same. Instead, the various features are graphed against piston position to better illustrate generally where the various events such as injection, intake and exhaust occur relative to one another in a typical 4 cycle engine cycle.

The various graphs of FIG. 2a–2g begin with the piston at bottom dead center and moving upward during the compression stroke of the engine. At the beginning point, both electrical actuators 41, 51 for the mono valve fuel injector 20 are deenergized such that both the needle control ball 44 and the main control ball 54 are pressure biased to their respective low pressure seats. When in this position, needle valve member 140 is held in its downward closed position because its closing hydraulic surface 49 is acted upon by high pressure in control passage 48 (See FIG. 3). FIGS. 4 and 5 are useful in illustrating that when main control valve 50 is in its de-energized position, high pressure exists in control passage 58, which keeps spool flow control valve 60 in its closed position. Even though high pressure exists in control passage 58b, since spool flow control valve 60 is in its closed position, PCV pilot valve 90 remains biased towards its upward position because of the low pressure existing in actuation fluid flow passage 69. This low pressure in flow passage 69 also results in gas exchange valve member 80 being biased toward its upward closed position. Likewise, port control valve 70 is pressure biased to its downward exhaust position because of the low pressure existing in control flow passage 75 due to the positioning of PCV pilot valve 90. Also during this time, intensifier piston/plunger 110 is retracted to its upward position and fuel pressure within the mono valve fuel injector 20 is low.

As piston 12 moves upward, the air within hollow piston cavity 11 is compressed. This compressed air in turn acts upon closing hydraulic surface 81 of gas exchange valve member 80 to further hold it in its upward closed position. As stated earlier, gas exchange valve member 80 closes passage 69c to isolate port control system 120. As piston 12 continues upward toward its top dead center position, main control ball valve 50 is activated by energizing solenoid 51. This drives ball valve member 54 downward to close high pressure seat 56 and open low pressure seat 57. This in turn causes pressure in control passage 58 to become low and relieves the previously high pressure acting upon end hydraulic surface 63 of spool flow control valve 60. This in turn causes spool valve member 62 to move downward against the action of its biasing spring 64 to an open position in which fluid flow passage 69 is opened to high pressure supply line 29. Because pressure in control passage 58 is now low, and passage 69c is blocked, PCV pilot valve 90 remains in its upward position. Because of the relatively high compression pressure in hollow piston cavity 11, gas exchange valve member 80 remains pushed upward toward its closed position. This results in high pressure in flow passage 69 acting upon the top hydraulic surface 111 of intensifier piston/plunger 110 to drive the same downward to compress fuel within the fuel pressurization chamber 113 of mono valve injector 20. When this occurs, fuel pressures within the mono valve injector 20 quickly rise to relatively high injection pressures. However, because needle control ball valve 40 is still in its de-energized position, high pressure continues to act on the closing hydraulic pressure surface 49 of needle valve member 140 to hold it in its downward blocked position. As the piston 12 continues moving up near its top dead center position, it becomes time to perform the fuel injection.

When it is time to inject fuel, the second electrical actuator 41 is energized to drive ball valve member 44 downward to close high pressure seat 46 and open low pressure seat 47. This relieves the high pressure acting on the closing hydraulic surface 49 and allows needle valve member 140 to lift to its upward inject position that allows high pressure fuel to enter hollow piston cavity 11 via nozzle outlet 45. Shortly before the desired amount of fuel has been injected, actuator 41 is de-energized, which allows ball valve member 44 to be hydraulically moved back to close low pressure seat 47 and reopen high pressure seat 46. Those skilled in the art will appreciate that direct control needle valve 40 also has the ability to rate shape and produce split injections. The re-pressurization of control passage 48 acts upon closing hydraulic surface 49 to move needle valve member 140 downward to its blocked position to close nozzle outlets 45 and end the injection event. Shortly thereafter, the first actuator 51 for main control valve 50 is de-energized to allow ball valve member 54 to hydraulically move upward to close low pressure seat 57 and reopen high pressure seat 56. This in turn causes pressure in control passage 58 to return to a high pressure acting upon end hydraulic surface 63 of spool valve member 62. Spool valve member 62 then becomes hydraulically balanced and its biasing spring 64 moves it upward to a position that connects flow control passage 69 to low pressure drain 31c. Shortly after the injection event ends, the power stroke portion of the engine begins as the compressed fuel air mixture ignites and pushes piston 12 downward toward its bottom dead center position.

Toward the end of the power stroke, as the piston 12 approaches its bottom dead center position, it becomes time to open the gas exchange valve member 80 to allow exhaust gases to escape hollow piston cavity 11. This is initially accomplished by again energizing solenoid 51 to move main control ball valve 54 from its low pressure seat 57 to close high pressure seat 56. This in turn allows spool flow control valve 60 to move to its upward open position in which flow passage 69 is again connected to high pressure supply line 29. Because the gas pressure now acting on the bottom closing hydraulic surface 81 of gas exchange valve member 80 is relatively low, the high pressure in flow passage 69 acts on opening hydraulic surface 83 to move gas exchange valve member 80 downward to its open position. This movement enables the port control system 120 by unblocking passage 69c. Because solenoid 41 remains de-energized at this time, high pressure in passage 48 holds needle valve member 140 in its closed position. This closure of nozzle outlet 45 causes intensifier piston/plunger 110 to be hydraulically locked and stationary despite the high pressure present in flow passage 69b. As piston 12 moves upward from its bottom dead center position toward its top dead center position, exhaust gases are pushed out of cavity 11, past seat 16 into radial exhaust openings 73, and into exhaust passage 15.

When piston 12 nears its top dead center position, it becomes time to switch the port control valve 70 to its intake position. This is accomplished by briefly de-energizing solenoid 51 so that ball valve member 54 quickly moves to close low pressure seat 57 and reopen high pressure seat 56. When this occurs, spool valve member 62 begins to slowly move toward its closed position. However, because of the mass properties and other engineering factors, spool valve member 62 is preferably intended to be rather sluggish in its movement when compared to the ball valve member 54 of the main control valve 50. Thus, for a brief period, high pressure exists in both control passage 58b and in flow passage 69c, which causes PCV pilot valve member 91 to move toward its downward position to open annulus 93 to the high pressure source 29g. Main control valve 50 need only be de-energized for a brief period of time since PCV pilot valve member 91 will be biased toward its downward position once it moves off of its upward position due to the now high pressure acting on the larger hydraulic surface area 97. When PCV pilot valve member 91 moves to its downward position, annulus 93 becomes open, and high pressure fluid pours into control flow passage 75 to act upon control hydraulic surface 71 to move port control valve 70 upward to its intake position at which exhaust passage 15 is blocked but intake passage 14 is open.

Next, piston 12 begins moving downward from its top dead center position toward its bottom dead center position, and brings fresh air into hollow piston cavity 11. It is important to note that because spool valve member 62 is preferably relatively sluggish in its performance relative to that of ball valve member 54, it is unable to move far enough to close the connection between high pressure line 29c and flow passage 69 during the de-energized stage used to initiate PVC motion. As piston 12 approaches its bottom dead center position, it becomes time to close gas exchange valve member 80 in preparation for the next compression stroke. This is accomplished by again de-energizing solenoid 51 so that main control ball valve member 54 moves back to close low pressure seat 57 and reopen high pressure seat 56. When this is done, spool valve member 62 becomes hydraulically balanced and begins moving back to a position that connects flow passage 69 to the low pressure source 30. When that occurs, PCV pilot valve member 90 returns to its upward position and gas exchange valve member 80 returns to its biased upward closed position. At about the same time, port control valve member 70 moves back downward to its normal biased exhaust position. The overall system is now ready to commence a subsequent engine cycle.

Because the various key events in the engine cycle occur at different times, the present invention has the ability to control fuel injection, intake and exhaust through the use of only two electrical actuators. Furthermore, all of these events are electronically controlled and thus can be performed, to some extent, independent of the engine crank shaft position. Not only does the design of the present invention permit these various functions to be performed through electronic control, but the various processes are done more efficiently since the exchange of gases can take place through a single relatively large opening positioned directly in the center at the top of the hollow piston cavity 11. This contrasts with prior designs in which two exhaust valves must compete for space with two separate intake valves and a centrally located fuel injector.

The monovalve fuel injection system of the present invention is believed to provide a number of subtle but important benefits. For instance, better air exchange can be accomplished with the use of a single mono valve rather than having to rely upon four individual gas exchange valves distributed around a centrally located fuel injector. This system also has a robust design because there is no possible positioning of the gas exchange valve member that could come into contact with the moving piston 12. This permits a "free-wheeling" design that avoids possible catastrophic engine failure due to valve/piston contact. Engines according to the present invention are also believed to be more robust since no material bridges between valves are needed in the engine head as in the case where four valves surround a centrally located fuel injector. The present invention also increases injection flexibility capabilities by having a separate direct control needle that is controlled by a single electrical actuator, preferable a dedicated actuator. The present invention also can permit variable valve timing to improve performance and provide the possibility of varied operating cycles, such as the Miller cycle. Finally, the present invention can improve robustness and reduce cost by reducing the overall part count from that of its multiple valve and fuel injector counterparts.

The above description is intended for illustrative purposes only, and it is not intended to limit the scope of the present invention in any way. For instance, while many of the various valve members are shown as being biased to one position or another through hydraulic pressure, other biasers, such as springs, could be employed and/or the biasing directions switched without otherwise changing the performance of the preferred embodiment. Thus, various modifications could be made to the illustrated embodiment without departing from the intended spirit and scope of the present invention, which is defined by the claims set forth below.

What is claimed is:

1. An engine comprising:
   an engine casing defining a hollow piston cavity separated from an exhaust passage and an intake passage by a valve seat;
   a gas exchange valve member positioned adjacent said valve seat and being movable between an open position and a closed position, and defining an opening that opens into said hollow piston cavity;
   a needle valve member positioned in said gas exchange valve member adjacent a nozzle outlet and being moveable between an inject position and a blocked position;
   a port control valve member having a port control hydraulic surface and being mounted around said gas exchange valve member and being moveable between an intake position at which said exhaust passage is blocked, and an exhaust position at which said intake passage is blocked; and
   a pilot valve moveable between a first position at which said port control hydraulic surface is exposed to a source of high pressure fluid, and a second position at which said port control hydraulic surface is exposed to a source of low pressure fluid.

2. The engine of claim 1 wherein said port control valve member includes an opposing surface oriented in opposition to said port control hydraulic surface; and
   a biaser in contact with said opposing surface.

3. The engine of claim 2 wherein said biaser is a pressurized fluid.

4. The engine of claim 1 wherein said pilot valve includes a PCV pilot valve member that is moveable between an up position and a down position, and said PCV pilot valve member includes a first hydraulic surface, and a second surface oriented in opposition to said first hydraulic surface; and
   a control valve having an on position at which at least a portion of said first hydraulic surface is exposed to a source of high pressure fluid, and an off position at which said first hydraulic surface is exposed to a source of low pressure fluid.

5. The engine of claim 1 wherein said needle valve member includes a closing hydraulic surface; and
   a needle control valve moveable between a stop position at which said closing hydraulic surface is exposed to a high pressure fluid, and a go position at which said closing hydraulic surface is exposed to a source of low pressure fluid.

6. The engine of claim 1 wherein said needle valve member is a portion of a hydraulically actuated fuel injector at least partially positioned in at least one of said port control valve member and said gas exchange valve member.

7. The engine of claim 1 wherein said pilot valve includes a PCV pilot valve member that is moveable between an up position and a down position, and said PCV pilot valve member includes a first hydraulic surface, and a second surface oriented in opposition to said first hydraulic surface; and
   a portion of said first hydraulic surface being fluidly isolated from another portion of said first hydraulic surface when said PCV pilot valve member is in said up position.

8. The engine of claim 7 wherein said portion of said first hydraulic surface surrounds said another portion of said first hydraulic surface.

9. The engine of claim 7 wherein said second surface of said PCV pilot valve member is in contact with a biaser.

10. The engine of claim 9 wherein said biaser is a pressurized fluid.

11. The engine of claim 1 wherein said pilot valve includes a PCV pilot valve member that is moveable between an up position and a down position, and said PCV pilot valve member includes a first hydraulic surface, a control hydraulic surface, and a second surface oriented in opposition to said first hydraulic surface and said control hydraulic surface; and
   said pilot valve further includes a ball valve member moveable between an A position at which said control hydraulic surface is exposed to a source of high pressure fluid, and a B position at which said control hydraulic surface is exposed to a source of low pressure fluid.

12. The engine of claim 1 wherein said needle valve member is a portion of a direct control needle valve;
   a first electrical actuator operably coupled to said direct control needle valve; and
   a second electrical actuator operably coupled to said gas exchange valve member and said port control valve.

* * * * *